(12) United States Patent
Tsunemoto

(10) Patent No.: US 7,094,983 B2
(45) Date of Patent: Aug. 22, 2006

(54) DUAL SWITCH FOR SELECTIVE REMOVAL OF RECORDING MEDIUM FROM COMPOUND DEVICE

(75) Inventor: Kinichi Tsunemoto, Fukui (JP)

(73) Assignee: Orion Electric Co., Ltd., Fukui (JP)

( * ) Notice: Subject to any disclaimer, the term of this patent is extended or adjusted under 35 U.S.C. 154(b) by 190 days.

(21) Appl. No.: 10/765,163

(22) Filed: Jan. 28, 2004

(65) Prior Publication Data

US 2004/0182685 A1    Sep. 23, 2004

(30) Foreign Application Priority Data

Jan. 31, 2003    (JP)    ............................. 2003-023516

(51) Int. Cl.
*H01H 23/24*    (2006.01)
(52) U.S. Cl. ..................... 200/339; 200/296
(58) Field of Classification Search ................ 200/5 R, 200/552, 553, 557, 559, 561–563, 573, 574, 200/339, 296
See application file for complete search history.

(56) References Cited

U.S. PATENT DOCUMENTS

| | | | |
|---|---|---|---|
| 4,332,991 A | * | 6/1982 | Nordstrom ................ 200/409 |
| 4,386,254 A | * | 5/1983 | Eberhardt et al. .......... 200/339 |
| 5,934,453 A | * | 8/1999 | Sugawara et al. .......... 200/339 |
| 6,037,552 A | * | 3/2000 | Yamada ...................... 200/339 |
| 6,114,637 A | * | 9/2000 | Nakao et al. ............... 200/5 R |
| 6,355,891 B1 | * | 3/2002 | Ikunami ..................... 200/315 |
| 6,576,855 B1 | * | 6/2003 | Levendis et al. ........... 200/339 |
| D476,970 S | * | 7/2003 | Patterson ................... D14/168 |
| 6,605,790 B1 | * | 8/2003 | Yoshida ...................... 200/339 |
| 6,756,556 B1 | * | 6/2004 | Kubota et al. .............. 200/556 |

FOREIGN PATENT DOCUMENTS

JP    7-211195    8/1995

* cited by examiner

*Primary Examiner*—Michael A. Friedhofer
(74) *Attorney, Agent, or Firm*—Wenderoth, Lind & Ponack, L.L.P.

(57) ABSTRACT

A dual switch for selective removal of a recording medium from a compound device is so exactly sized and shaped that are exact switching action may be assured. Two switches are on a base plate, and a button is capable of selectively actuating either switch to take a recording medium out of the slot. The button has resilient member responsive to removal of pressure from the button for returning to its original position. The button can be of seesaw, slide or rotary type.

2 Claims, 7 Drawing Sheets

DUAL SWITCH FOR SELECTIVE REMOVAL OF RECORDING MEDIUM FROM COMPOUND DEVICE

BACKGROUND OF THE INVENTION

1. Field of the Invention

The present invention relates to an electric switch for selective removal of a recording medium from a compound device which combines two pieces of equipment, such as a disk device and video device.

2. Related Art

Referring to FIG. 7, a compound device combines a video device and a disk device, and it has a cassette slot 51 and a disk slot 52 formed in its front panel 50. Also, the front panel 50 has a button switch 53 on the left side of the cassette slot 51, and another button switch 54 on the right side of the disk slot 52. Depression of the button switch 53 causes the cassette to appear from the cassette slot 51 whereas depression of the button switch 54 causes a disk tray to appear from the disk slot 54. When the compound device is loaded with a new cassette, the cassette is pushed in the cassette slot 51. When the compound device is loaded with a new disk, the disk is put on the tray, which appears from the disk slot 52. Then, the tray-and-disk is pushed in the disk slot 52.

FIG. 7(b) shows each switch 53, 54 in an exploded view. As shown, the switch comprises a push button 55a or 55b and a base plate 56a or 56b, on which a switching means 58a or 58b is fixed. Rectangular holes 57a and 57b are made in the front panel 50. The push buttons 55a and 55b are fitted in the rectangular holes 57a and 57b. Then, the base plates 56a and 56b are fixed to the front panel 50 with screws. When the push button 55a is depressed, the switching means 58a turns on, so that the cassette is pushed out of the cassette slot 51. Likewise, when the push button 55b is depressed, the switching means 58b turns on, so that the tray-and-disk is pushed out of the disk slot 52.

Arrangement of two switches on the front panel makes the compound device less attractive in appearance. Also, use of two switches disadvantageously increases the assembly work and accordingly the manufacturing cost of the compound device increases. The front panel with two rectangular holes requires a metal mold whose shape is rather complicated, and accordingly the metal mold costs much. At the final stage of assembly, the compound device must be checked in respect of whether these two switches can work normally. Accordingly, extra time is involved for checking at the final stage.

In the hope of solving such a problem, JP 7-211195(A) entitled "Seesaw Button Device" has proposed use of a dual switch. It comprises a base plate having two switches mounted thereon, a seesaw type of push button supported in the middle to move up and down by pushing one or the other end with finger, and an intermediate plate placed between the seesaw button and the base plate. The seesaw button has two push legs and two semicircular projections, which are formed at the middles of the opposite longitudinal sides of the button. Each push leg is long enough to reach the corresponding switch when the button is pushed and inclined down on one side. In the intermediate plate two apertures are made to allow the push legs to pass therethrough. Also, a semicircular fulcrum is formed in the middle of the intermediate plate, semicircular notches are made in the middles of the opposite longitudinal sides of the intermediate plate, and cantilever-like support pieces are integrally connected to the intermediate plate to extend half way in the apertures. The seesaw button is nested with the intermediate plate by putting the seesaw button on the semicircular fulcrum, inserting the push legs in the apertures to reach short of the switches and snapping the semicircular projections into the semicircular notches. In the horizontal position the seesaw button stays on the opposite cantilever-like support pieces. Finger-depression of the seesaw button on one side against the cantilever-like piece makes one of the push legs push the corresponding switch to turn on. Then, the associated drive mechanism moves the cassette, and it appears from the cassette slot of the front panel. Finger-depression of the seesaw button on the other side makes the other push leg push the corresponding switch to turn on. Then, the tray-and-disk will appear from the disk slot of the front panel. Release of the seesaw button allows it return to its original horizontal position under the influence of one or the other cantilever-like support piece.

To assure that the push button springs back to its original horizontal position when the finger is removed to release the push button, the cantilever-like support pieces need to have enough resilience. It is required that such cantilever-like support pieces be exactly sized and shaped, and be sometimes made of special metals. The resilient pieces are small compared with the front panel, and therefore, it is very difficult to make them into exact shape and size as required when the front panel having the cantilever-like pieces appearing halfway in its apertures is injection-molded. It is almost impossible to make a front panel whose cantilever-like pieces are of a material (or spring metal) which is different from that of the front panel. Such a resilient piece should neither be too strong in resilience to push the seesaw button without difficulty, nor too weak to make the seesaw button return to its original horizontal position. As a matter of fact it is practically impossible to injection-mold a front panel whose cantilever-like pieces extend halfway in its apertures.

In view of the above, one object of the present invention is to provide a dual switch for selective removal of a recording medium from a compound device, in which the button is self-repulsive enough to return to its original position after actuation, and thanks to the integral connection of spring means to the button, the spring means can be so exactly sized and shaped that the exact switching action may be assured.

SUMMARY OF THE INVENTION

In a compound device combining two pieces of equipment such as a disk device and a video device having a slot with respect to each equipment on its front panel to take a recording medium such as a video cassette or a disk out of the respective slot, a dual switch comprising two switching means on a base plate and a button capable of selectively actuating either switching means to take a recording medium out of the slot is improved according to the present invention in that the button has resilient means responsive to removal of pressure from the button for returning to its original position.

The button may be a seesaw button to be fitted in an aperture made in the front panel, the front panel having a support traversing across the aperture, the button having two arrow-headed legs integrally connected to the opposite ends of the rear side, and a resilient support leg integrally connected to the middle of the rear side of the button. The arrow-headed legs are long enough to reach the switching means, whereby the button can be loosely fastened in the aperture with the opposite arrow-headed legs caught by counter notches made on the rear side of the front panel. The resilient support leg stands on the support traverse.

The button may be a seesaw button having a squared "B"-shaped frame surrounding the button, the frame having the resilient means in the form of a twistable traverse beam. The button has two legs integrally connected to the opposite ends of the rear side of the button, and rides on the twistable traverse beam with the opposite legs suspended on opposite sides of the traverse beam. The legs are long enough to reach the switching means.

The button may be a slide button to be fitted in an aperture made in the front panel, the front panel having a button guide plate extending in the aperture. The button has two curved resilient legs integrally connected to opposite ends of the rear side of the button. The button has an intermediate hammer-like leg integrally connected to the middle of the rear side of the button, the hammer-like leg being long enough to reach the switching means. The button is adapted to be guided by the button guide plate, whereby when the button is moved back and forth, the corresponding curved leg is yieldingly bent, and the head of the intermediate hammer-like leg hits and pushes the corresponding switching means.

The button may be a slide button to be fitted in an aperture made in the front panel, the button having a hammer-like leg integrally connected to the middle of the rear side of the button. The hammer-like leg is long enough to reach either switching means, and has a resilient linear object fixed to its shank. When the button moves back and forth, the resilient linear object is yieldingly bent until the head of the hammer-like leg is put in contact with the corresponding switching means.

The button may be a rotary button having a shank integrally connected to its center, one resilient radial arm and two further radial arms integrally connected to the end of the shank. The resilient radial arm is fixed to the front panel, and the two further radial arms are so positioned relative to the two switching means that clockwise or counterclockwise rotation of the rotary button makes one or the other radial arm hit and push the corresponding switching means.

Other objects and advantages of the present invention will be understood from the following description of dual-switches according to some preferred embodiments of the present invention, which are shown in accompanying drawings.

DETAILED DESCRIPTION OF PREFERRED EMBODIMENT

Figure 1A:
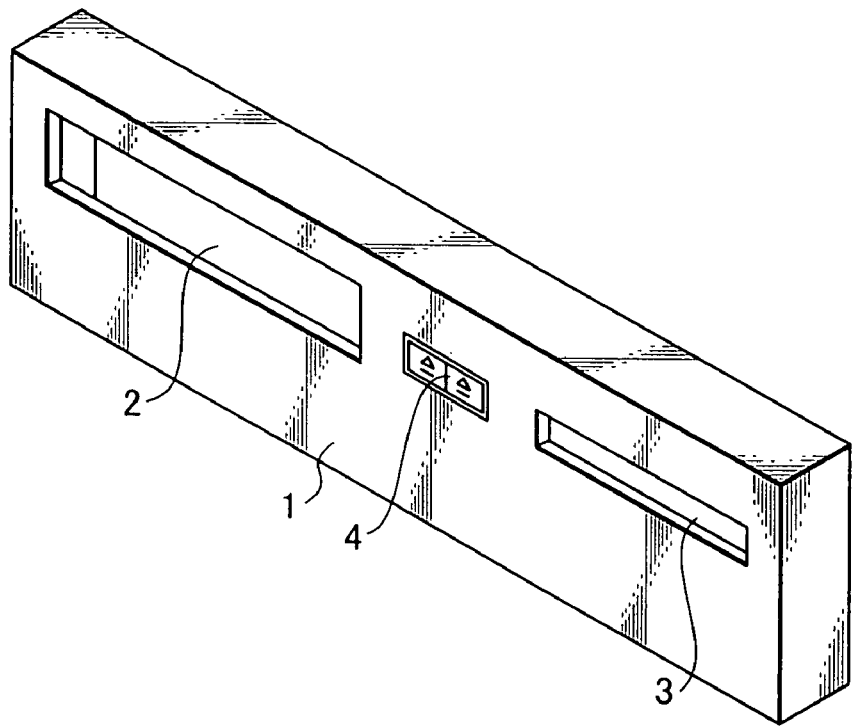
FIG. 1a is a perspective view of a front panel of a compound device.
Figure 1B:
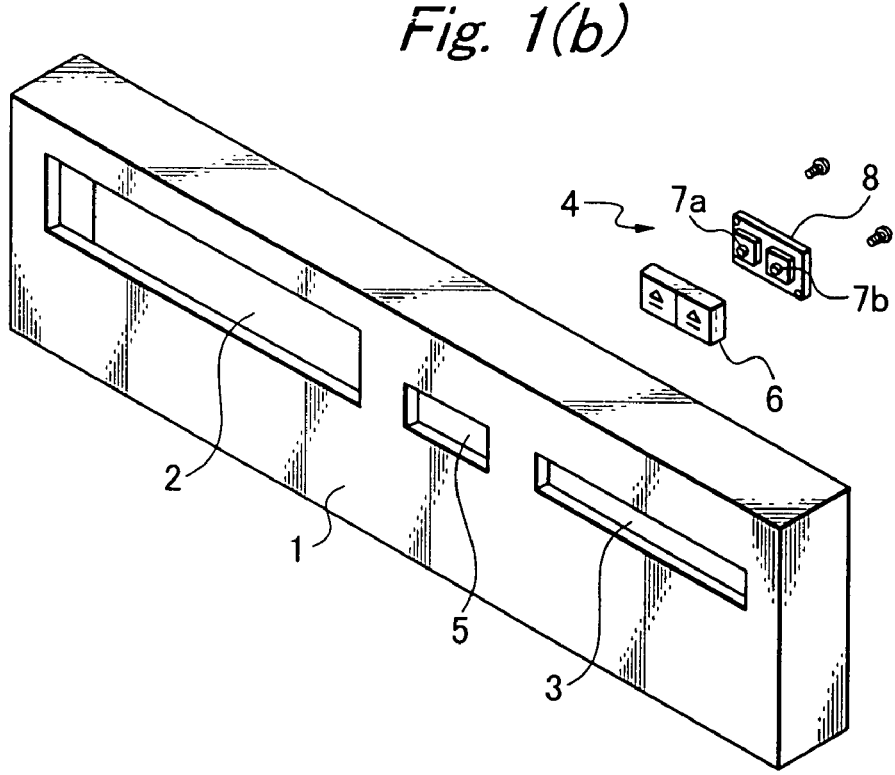
FIG. 1b is a similar perspective view, but showing its dual switch in an exploded view.

Referring to FIG. 1a, a compound device has a cassette slot 2 and a disk slot 3 formed on its front panel 1. A dual switch 4 according to the present invention is between the cassette slot 2 and the disk slot 3. FIG. 1b shows the dual switch 4 in an exploded state. Its button 6 is a seesaw type to be fitted in the rectangular aperture 5 made between the cassette slot 2 and the disk slot 3 in the panel 1. As shown, two switching means or switches 7a and 7b are on a base plate 8. When the seesaw button 6 is depressed on the right side by a finger, the right switching means 7b turns on, and then a disk tray bearing a disk appears from the disk slot 3. When the seesaw button 6 is depressed on the left side by finger, the left switching means 7a turns on, and then the videotape or cassette appears from the cassette slot 2. When the pressure by finger is removed from the seesaw button 6, the button returns to its original horizontal position.

Figure 2A:
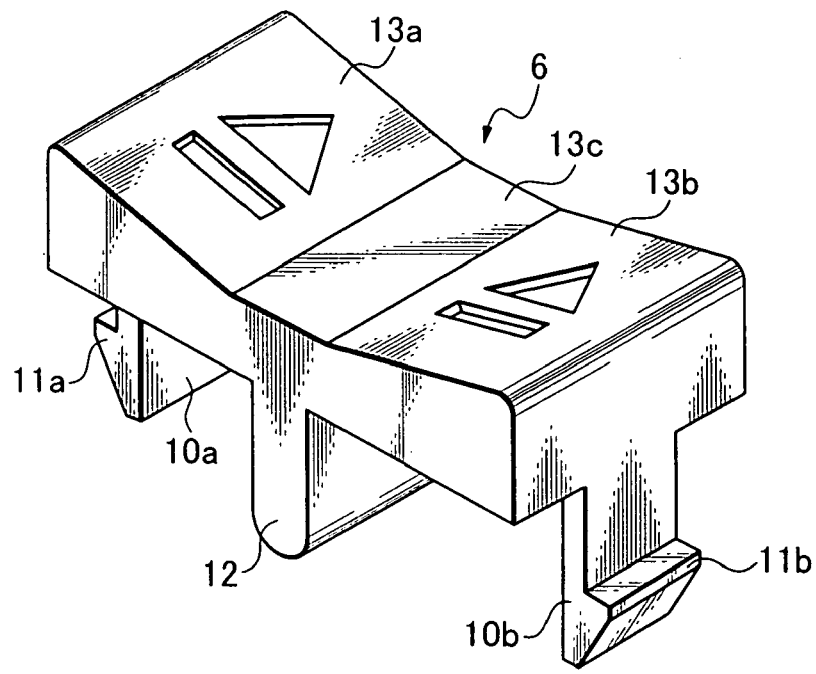
FIG. 2a is a perspective view of a dual switch according to a first embodiment of the present invention.
Figure 2B:
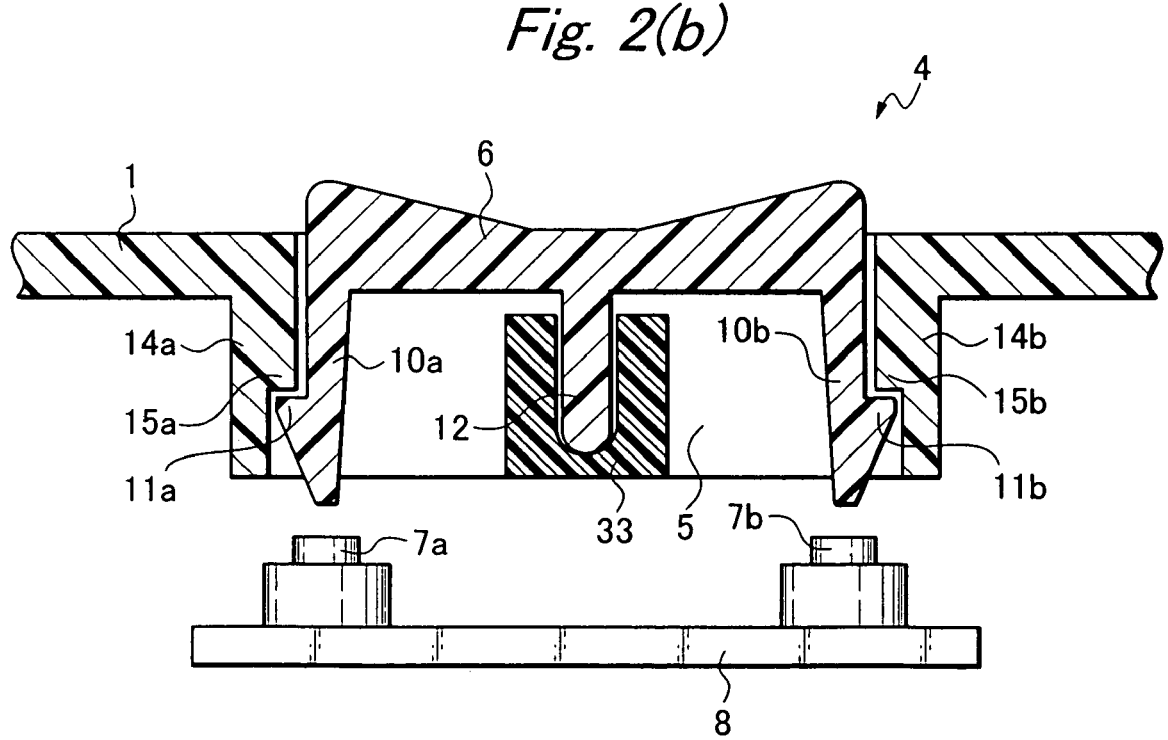
FIG. 2b is a longitudinal section of the dual switch.

One example of such a seesaw button 6 is shown in FIGS. 2a and 2b. The button 6 has two arrow-headed legs 11a and 11b integrally connected to the opposite ends of the rear side of the button 6. Also, it has a resilient support leg 12 integrally connected to the middle of the rear side of the button 6. The seesaw button 6 has two opposite slopes 13a and 13b and a flat middle 13c all defined on its front surface, thereby facilitating depression of the switch on either side by finger.

As shown in FIG. 2b, the seesaw button 6 is loosely fitted in the rectangular aperture 5 in the front panel 1. The front panel 1 has notched suspension pieces 14a and 14b integrally connected to the opposite short sides of the rectangular aperture 5. The arrow-headed legs 11a and 11b of the seesaw button 6 are caught by the notches 15a and 15b of the suspension pieces 14a and 14b.

The front panel 1 has a grooved support traverse 33 in the rectangular aperture 5. The seesaw button 6 is press-fitted in the rectangular aperture 5 while the arrow-headed legs 10a and 10b are made to yieldingly bend inward. Finally the seesaw button 6 is loosely fastened in the rectangular aperture 5 with the opposite arrow-headed legs 10a and 10b caught by the notches 15a and 15b, and with the resilient support leg standing on the rounded bottom of the groove of the support traverse 33.

The base plate 8 is fastened to the chassis of the compound device with screws, and it is so positioned that the arrow-headed legs 10a and 10b may reach short of the switching means 7a and 7b while the seesaw button remains in its original position, and so that depression of the seesaw button 6 on its left side (or its right side) may make the resilient support leg 12 yieldingly bend, thereby making the left arrow-headed leg 10a (or the right arrow-headed leg 10b) push the switching means 7a (or 7b) for turning on. Release of the seesaw button 6 allows it to return to its original horizontal position, so that the arrow-headed leg 10a (or 10b) leaves the switching means for turning off. Specifically, depression of the slope 13a causes the cassette to appear from the cassette slot 2, whereas depression of the slope 13b causes the tray-and-disk to appear from the disk slot 3, thus permitting the disk to be taken out and another disk to be put on the disk tray for loading.

Figure 3A:
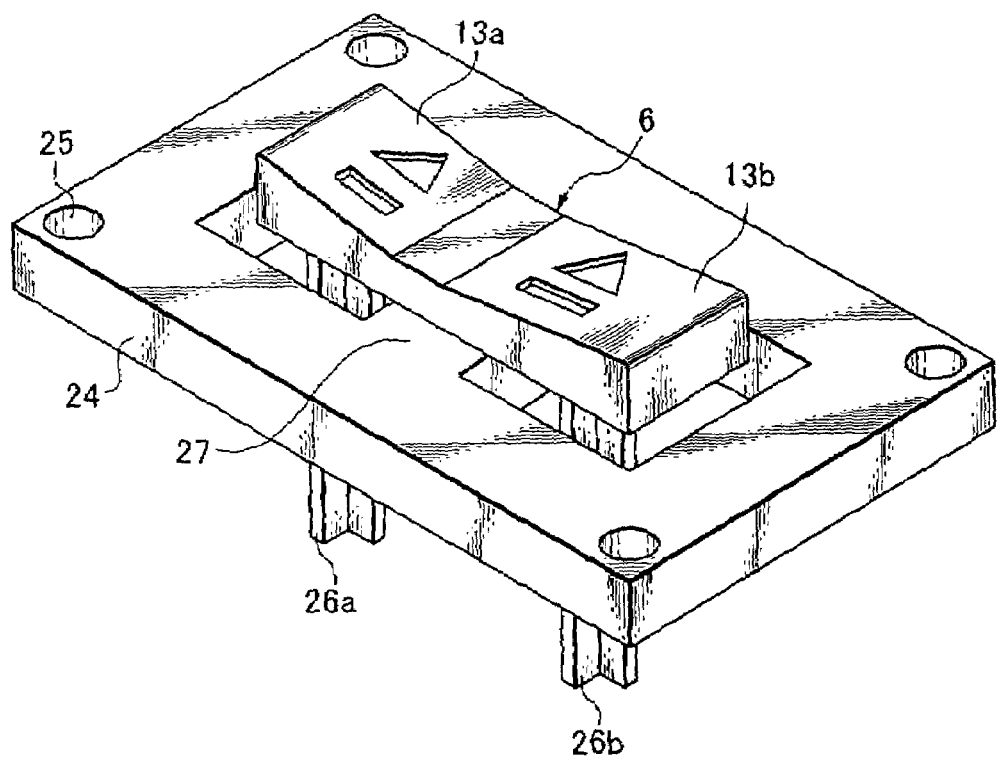
FIG. 3a is a perspective view of a dual switch according to a second embodiment of the present invention.
Figure 3B:
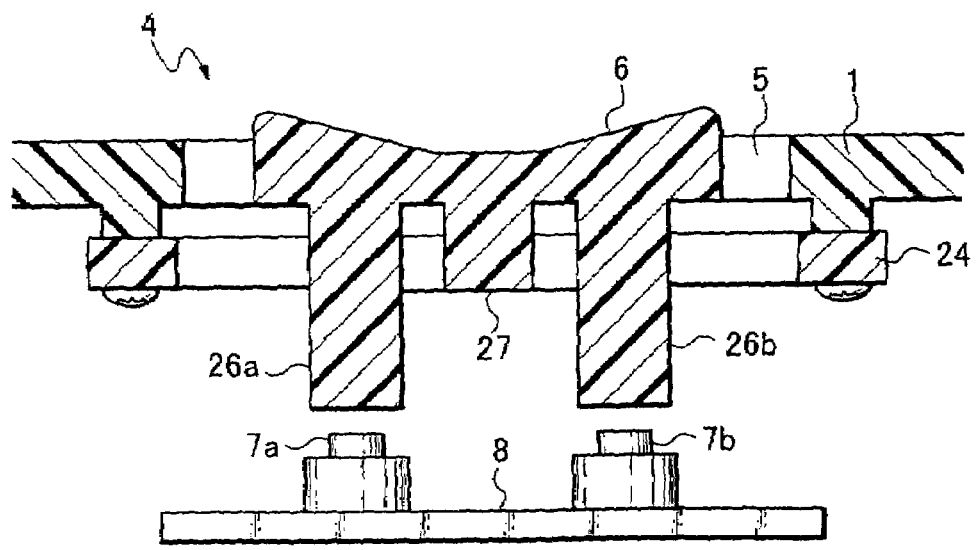
FIG. 3b is a longitudinal section of the dual switch.

FIGS. 3a and 3b show another example of seesaw button 6 having identically a squared "B"-shaped frame 24 surrounding the button 6. The squared "B"-shaped frame 24 has a twistable traverse beam 27 across its rectangular space. The frame 24 is laid across the rectangular aperture 5 of the front panel 1, and is fixed at its four corners to the front panel 1 by inserting and driving screws in the corner holes 25. The button 6 has two legs 26a and 26b integrally connected to the opposite ends of the rear side of the button 6. The button 6 rides on the twistable traverse beam 27 with the opposite legs 26a and 26b suspended on the opposite sides of the traverse beam 27. These legs 26a and 26b reach the switching means 7a and 7b, which are mounted on the base plate 8.

Depression of the left half 13a of the button 6 makes the traverse beam 27 twist so that the left leg 26a may push the left switching means 7a for turning on. Likewise, depression of the right half 13b makes the right leg 26b push the right switching means 7b for turning on. Removal of pressure by the finger from either half permits the traverse beam 27 untwist, and then the switch button 6 returns to its original horizontal position.

Figure 4A:
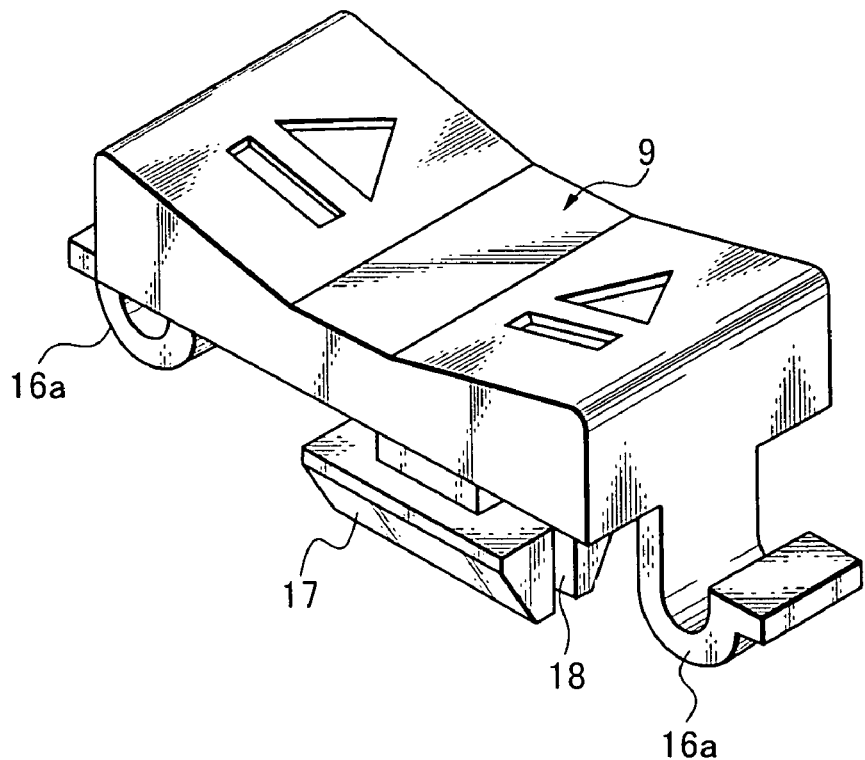
FIG. 4a is a perspective view of a dual switch according to a third embodiment of the present invention.
Figure 4B:
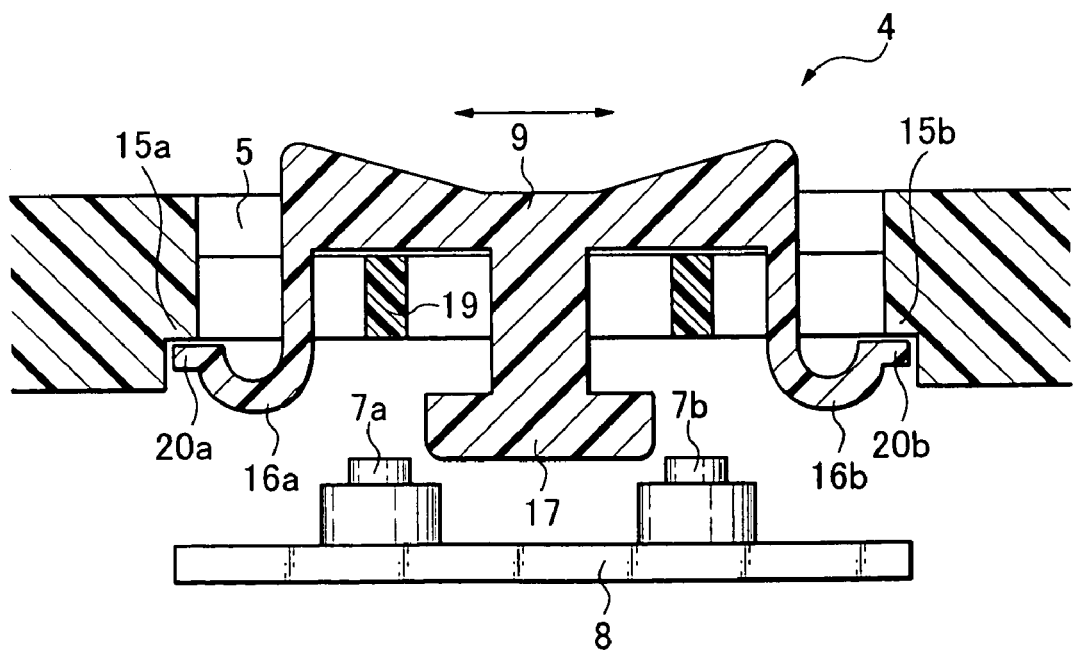
FIG. 4b is a longitudinal section of the dual switch.

FIGS. 4a and 4b show a slide type of button 9 loosely fitted in the rectangular aperture 5 of the front panel 1. The front panel 1 has a middle guide-and-support plate 19 longitudinally traversing the rectangular aperture 5, and the opposite lateral edges of the rectangular aperture 5 has notches 15a and 15b. The button 9 has two curved resilient legs 16a and 16b integrally connected to the opposite ends of the rear side of the button 9. These curved resilient legs 16a and 16b are yieldingly deformable. Also, the button 9 has an intermediate hammer-like leg 17 integrally connected to the middle of the rear side of the button 9. The hammer-like leg 17 has a slot 18 longitudinally cut therein.

The button 9 is press-fitted in the rectangular aperture 5 while the curved resilient legs 16a and 16b are yieldingly bent, and the middle guide-and-support plate 19 is slidably fitted in the slot 18 of the hammer-like leg 17. Finally, the curved resilient legs 16a and 16b are caught by the notches 15a and 15b as indicated at 20a and 20b.

When the button 9 is moved leftwards, the left leg 16a is yieldingly deformed, and the hammer-like leg 17 is guided by the middle guide-and-support plate 19 to hit and push the switching means 7a on the top for turning on. When the finger is removed from the button 9, the deformed leg 16a returns to its stress-free position, thereby putting the button 9 in its original position.

Figure 5A:
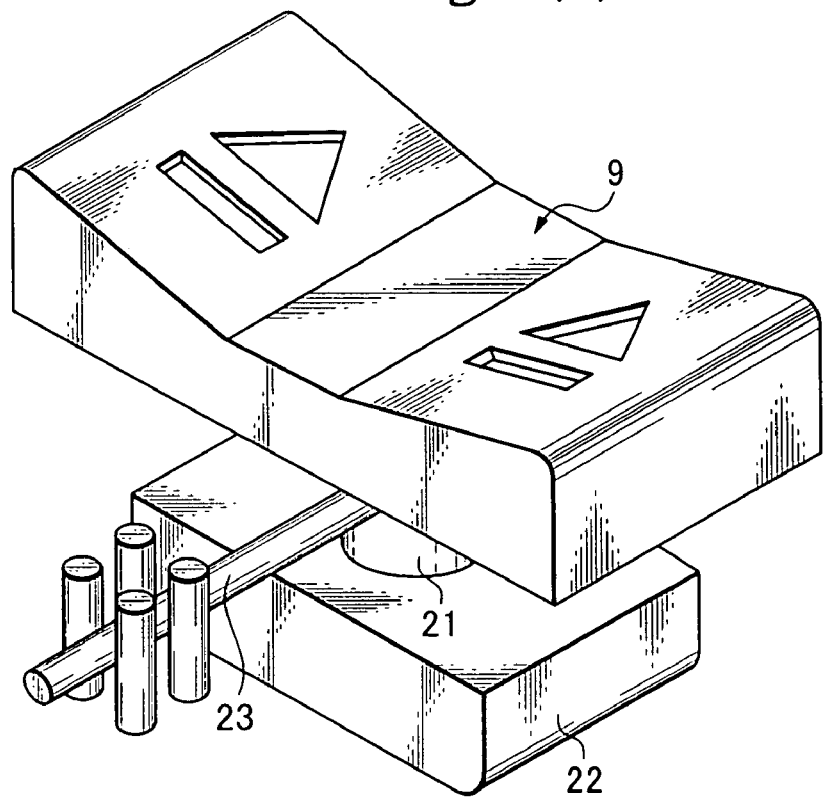
FIG. 5a is a perspective view of a dual switch according to a fourth embodiment of the present invention.
Figure 5B:
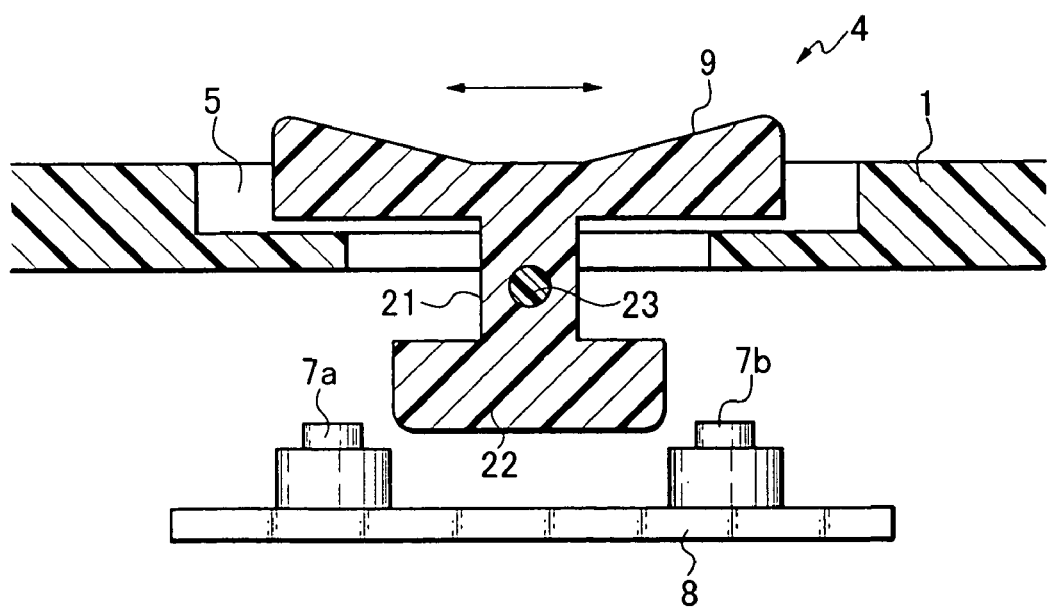
FIG. 5b is a longitudinal section of the dual switch.

FIGS. 5a and 5b show another slide type of button 9, which is loosely fitted in the rectangular aperture 5. The button 9 has a hammer-like leg 21 integrally connected to the middle of the rear side of the button 9. The hammer-like leg 21 is long enough to reach either switching means 7a or 7b, and has a through hole made in its shank. As shown, the hammer-like leg 21 has a resilient linear wire 23 passing through the through hole, and the resilient wire 23 is fixed at the opposite ends to the front plate 1. In the normal position the button 9 is in the rectangular aperture 5, leaving the same distance to the counter side of the rectangular aperture. The button 9 can be moved back and forth while making the resilient linear wire 23 yieldingly bend until a head of the hammer-like leg 22 is put in contact with the corresponding switching means 7a or 7b for turning on.

When the button 9 is moved back or forth, the linear wire 23 is twisted clockwise or counterclockwise. When the finger is removed from the button 9, the twisted wire returns to its stress-free position, thereby allowing the button 9 to return to the middle of the rectangular aperture 5. The linear wire 23 may be integrally connected to the hammer-like leg button 22 by injection molding, and the linear wire 23 may be fixed at the opposite ends to the front plate in any appropriate way.

Figure 6:
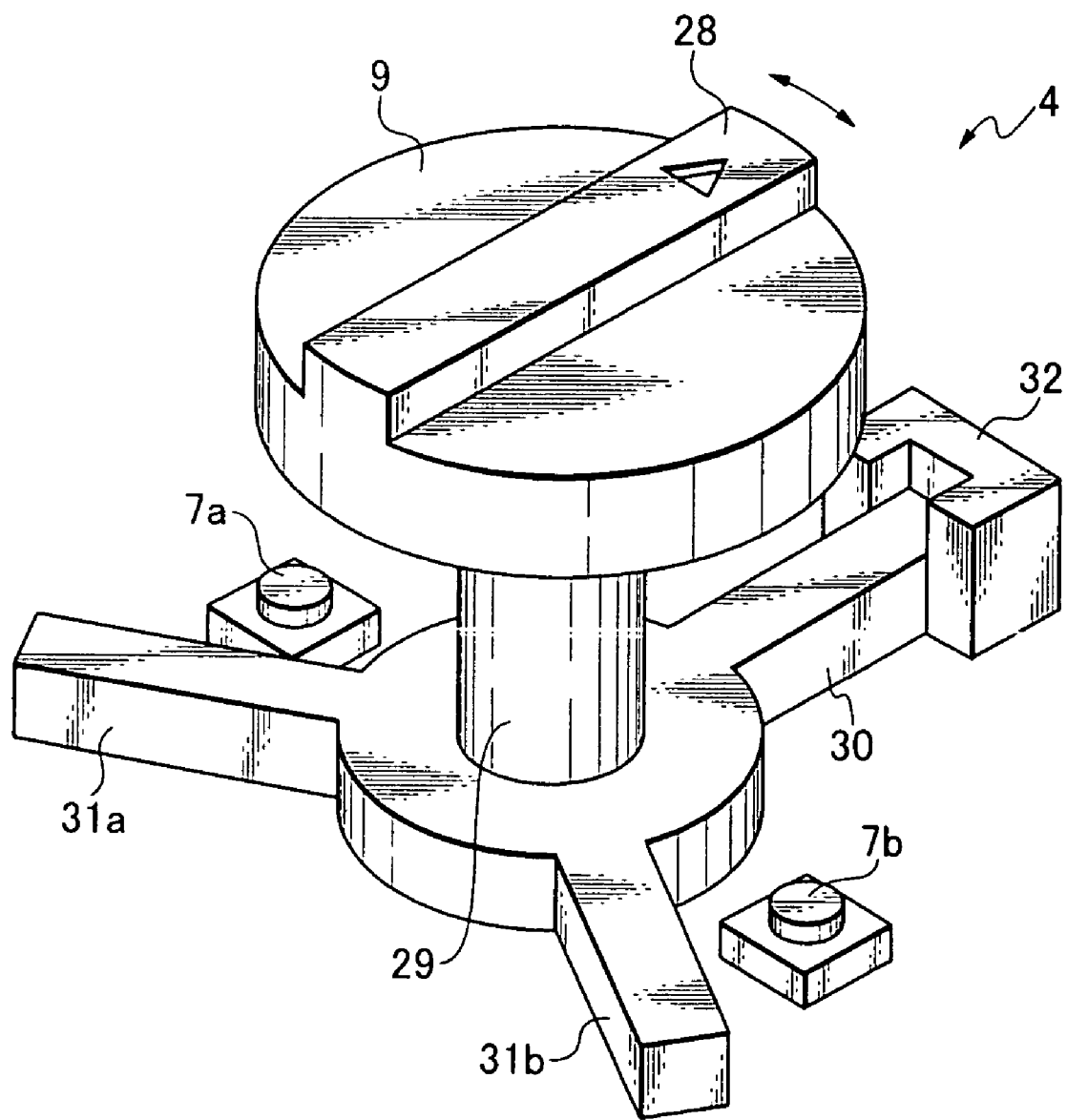
FIG. 6 is a perspective view of a dual switch according to a fifth embodiment of the present invention.
Figure 7A:
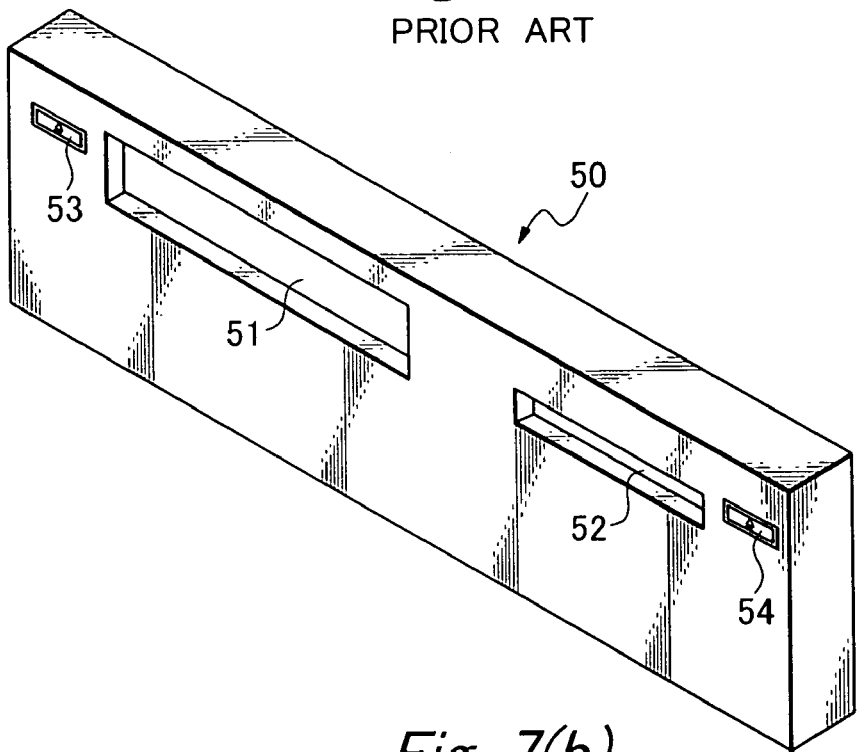
FIG. 7a is a perspective view of a front panel of a compound device equipped with conventional switches.
Figure 7B:
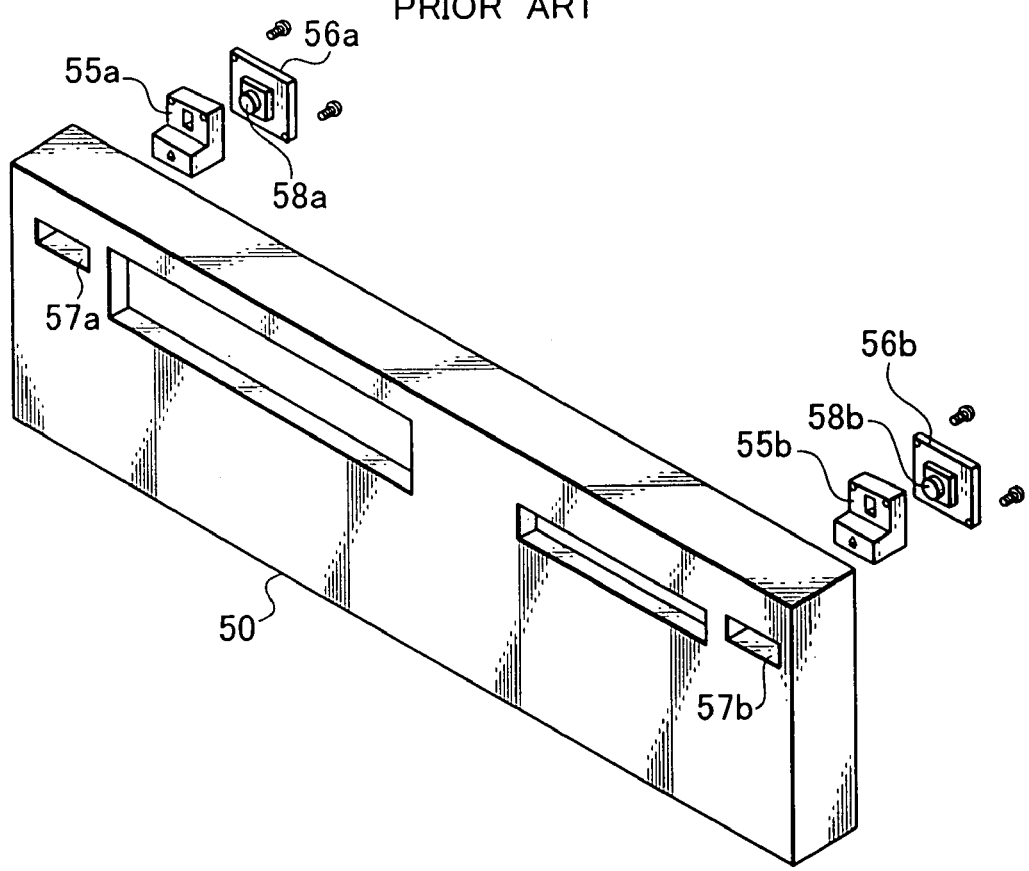
FIG. 7b is a similar perspective view, but showing the switches in an exploded view.

FIG. 6 shows a rotary type of button 9 having a thumb catch 28 formed on its top, and a shank 29 integrally connected to the center of the rear side of the rotary button 9. The shank 29 has one resilient radial arm 30 and two radial arms 31a and 31b integrally connected to the end of the shank 29. The resilient radial arm 30 is inserted in a "U"-shaped block 32 fixed to the front panel 1.

The radial arms 31a and 31b are so positioned relative to the switching means 7a and 7b that clockwise or counterclockwise rotation of the rotary button 9 makes one or the other radial arm 31a or 31b hit and push the corresponding switching means 7a or 7b for turning on. When the finger is removed from the thumb catch 28, the bent radial arm 30 is unbent to rotate the rotary button 9 toward its original position, thus making the radial arm 31a or 31b leave the switching means 7a or 7b for turning off.

As understood from the above mentioned, the dual switch according to the present invention is made to selectively actuate either switching means to turn on by seesaw, sliding or rotary movement of the button to take a recording medium out of either slot, and allowing the button to return to its original position by removal of the finger from the button. The seesaw, sliding or rotary operation of the button can be made so smoothly and the button can return precisely to its original position.

Thanks to the integral connection of a spring member or spring means to the button, the spring means can be so exactly sized and shaped that the exact switching action may be assured in comparison with the conventional switch where the spring means is made integrally with the large size of the front panel.

What is claimed is:

1. A dual switch for a compound device combining two pieces of equipment including a disk device and a video device in which a slot is provided for each of the two pieces of equipment on a front panel thereof for removal or insertion of a recording medium, comprising:
   two switching means on a base plate; and
   a button capable of selectively actuating either switching means for taking a recording medium out of a corresponding slot, said button having resilient means responsive to removal of pressure from said button to return said button to an original position thereof;
   wherein:
   said button is a seesaw button fitted in an aperture in the front panel,
   the front panel has a support traverse crossing the aperture,
   the button has two arrow-headed legs integrally connected to opposite ends of a rear side of said button and a resilient support leg integrally connected to a middle part of the rear side of said button,
   the arrow-headed legs have a length sufficient to reach said switching means, and
   said button is loosely fastened in the aperture so that the arrow-headed legs can be caught by counter notches on a rear side of the front panel and said support leg stands on said support traverse.

2. A dual switch assembly for a compound device combining two pieces of equipment including a disk device and a video device in which a slot is provided for each of the two pieces of equipment on a front panel thereof for removal or insertion of a recording medium, comprising:
   two switches on a base plate; and a button capable of selectively actuating either of said two switches for taking a recording medium out of a corresponding slot, said button having a resilient member responsive to removal of pressure from said button to return said button to an original position thereof; wherein:
- said button is a seesaw button fitted in an aperture in the front panel,
- a support traverse is provided crossing the aperture,
- the button has two arrow-headed legs integrally connected to opposite ends of a rear side of said button and a resilient support leg integrally connected to a middle part of the rear side of said button,
- the arrow-headed legs have a length sufficient to reach said switches, and
- said button is fitted in the aperture so that the arrow-headed legs are caught by counter notches on a rear side of the front panel and so that said support leg stands on said support traverse.

* * * * *